Oct. 29, 1935.  J. J. BLUM  2,019,247

AUTOMOBILE DOOR PANEL

Filed Sept. 25, 1933

Inventor:
Jerome J. Blum,
By: Lee J. Gary
Attorney.

Patented Oct. 29, 1935

2,019,247

UNITED STATES PATENT OFFICE 2,019,247

AUTOMOBILE DOOR PANEL

Jerome J. Blum, Olean, N. Y., assignor to Arveyware Corporation, Olean, N. Y., a corporation of Delaware Application September 25, 1933, Serial No. 690,831

2 Claims. (Cl. 296—44)

This invention relates to improvements in automobile body constructions, and refers specifically to the provision of an integral door panel and arm rest structure particularly adaptable for the front doors of four-door type cars or the doors or two-door types such as coaches, coupés, roadsters or the like.

In automobile door constructions, it has heretofore been the practice to cover the inner surface of the door frame with fibre board which is die cut, embossed when embossing is required, covered with upholstery and then attached to the door frame. When an arm rest is required in the panels of the front doors, the same has heretofore been fabricated of either heavy fibre board, distortable rubber, or a wood and metal combination and attached to the cross members in the door frames by means of nails, screws, adhesives, tongue and slot connections or the like.

If the supports or cross members are not sufficiently sturdy, this type arm rest will fail to give the satisfaction required and will not withstand the hard usage to which it is normally subjected. The fibre board of which the door panels are usually fabricated is not by any means sufficiently strong enough to carry an arm rest, and due to the mechanism which raises and lowers the window in the door as well as the latching device for the door, it is frequently very difficult to provide adequate support for an arm rest without incurring considerable expense in door construction.

Briefly described, my invention resides in the provision of a combination door panel constructed of fibrous material having an integrally formed arm rest, the panel, ornamental beads or welts upon the panel and arm rest being constructed in one operation.

The objects and advantages of my invention will be apparent from the accompanying drawing and following detail description.

In the drawing, Fig. 1 is a fragmentary interior view of the front portion of an automobile.

Figure 1:
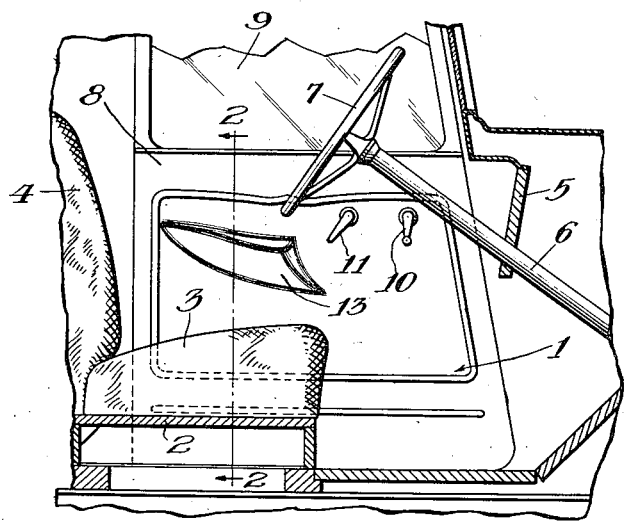
Figure 2:
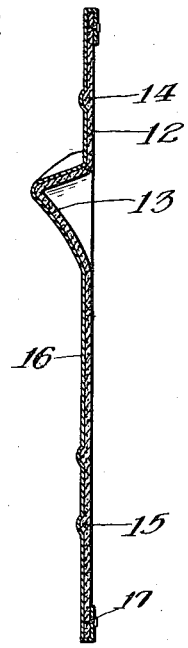
Fig. 2 is a sectional view taken on line 2—2 of Fig. 1.
Figure 3:
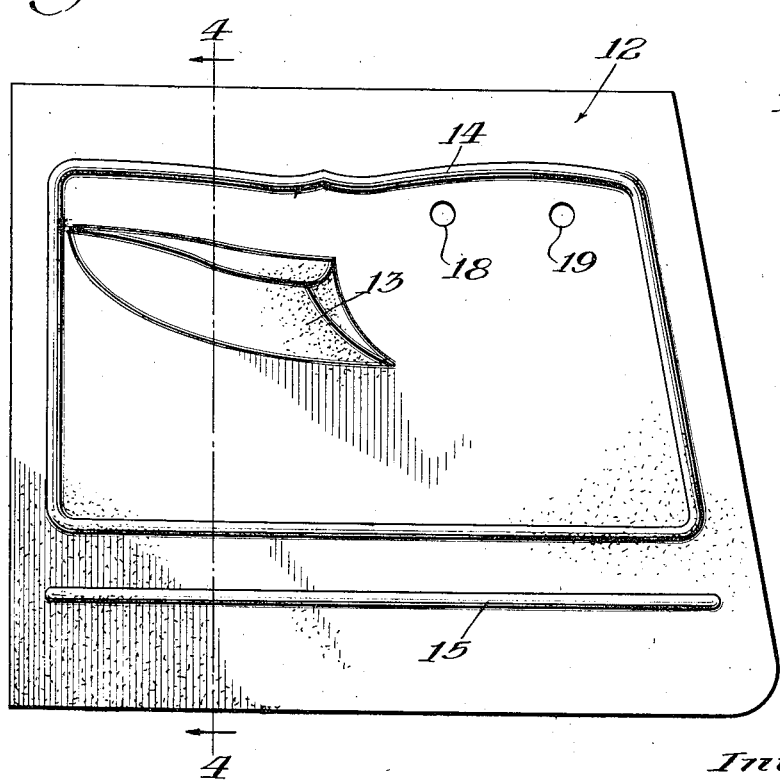
Fig. 3 is a front elevational view of the combination panel and integral arm rest.
Figure 4:
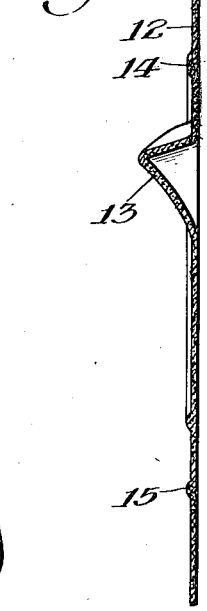
Fig. 4 is a sectional view taken on line 4—4 of Fig. 3.

Referring in detail to the drawing, 1 indicates a portion of the interior of the front compartment of an automobile. The reference numeral 2 indicates a support for seat cushions 3 and 4 positioned immediately behind dash 5. Steering post 6 may pass through dash 5 and may carry steering wheel 7. A door 8 may be positioned at each side of the compartment 1 and may be provided with window 9 which may be raised or lowered by means of the usual mechanism, not shown, operated by crank 10. Lever 11 may also protrude from the inside of the door whereby the same may be unlatched.

The hereinabove described elements, of course, are conventional in automobile construction and comprise no part of my invention.

The inner surfaces of doors 8 are usually upholstered in conformity with the scheme of the cushions 3 and 4 and the remaining upholstered portions of the car. In order to provide a base for the door upholstering, fibre board panels have been secured to the frame of the door, as has been hereinbefore described. However, if an arm rest is desired, complications enter into the construction since heretofore the arm rest has been secured directly to the frame of the door involving intricate and expensive means of attachment.

As a feature of my invention, I secure to the inner surface of the door frame by means of nails, screws or the like, not shown, a panel 12 constructed of fibrous material. The panel 12 may be formed by felting a fibrous pulp upon a form of desired shape or configuration. A protruding portion 13 of panel 12 may thus be formed, the portion 13 being integral with the panel and constructed simultaneously with the panel. During felting of the panel 12, decorative beads or welts 14 and 15 may be formed which protrude from the face of the panel. Beads 14 and 15 in addition to ornamenting the panel also serve to reinforce the same and impart rigidity thereto.

Panel 12, prior to mounting upon door 8 may be covered with upholstery 16 which may be secured thereto by tacks 17 or otherwise. The protruding portion 13, of course, serves as an arm rest for the driver of the car and for the passenger in the front seat. If desired, the arm rest 13 may be covered with sponge rubber or other padding, not shown, prior to covering the panel with upholstery 16.

Apertures 18 and 19 may be provided in the panel for lever 11 and crank 10 respectively.

Arm rest 13, being formed integral with panel 12, needs no additional reinforcement nor is any special means of attachment necessary and yet the arm rest is sufficiently strong and rugged to withstand the severest abuse. In addition, arm rest 13 and panel 12 being formed integral involves but one operation in the construction of the panel and may be upholstered and mounted upon the door in two simple operations. This saving in time, labor and material permits of the use of front seat arm rests in relatively inexpensive cars, the cost of which heretofore has been prohibitive for all but the most expensive automobiles. Further the strength of this structure is greater than similar constructions heretofore used and is appreciably lighter in weight.

It is to be understood, of course, that although the integral door panel and arm rest comprising my invention is shown and described as being constructed of felted fibrous material, broadly my invention contemplates a door panel and arm rest constructed as a one-piece unit irrespective of its manufacture or the material comprising the structure. For instance, the panel and arm rest may comprise an integral unit which may be molded into form, as for example, pressed or molded bituminized fibre, molded synthetic resins either with or without fibres, molded rubber or rubber mixtures containing or not containing fibres, or in general any suitable thermo-plastic material mixed with or without fibres.

It can readily be seen that integral automobile door panels and arm rests constructed of the materials suggested are more economical to produce and involve fewer and simpler steps in assembly, permitting use of said structures in low price automobiles where heretofore the cost of similar constructions has been prohibitive.

I claim as my invention:

1. An automobile door panel comprising a relatively flat felted fibrous sheet having an integrally felted hollow projecting ledge formed intermediate the area of the sheet to serve as an arm rest, said ledge being substantially triangular in transverse section.

2. An automobile door panel comprising a unitary relatively flat felted fibrous sheet having an integrally felted hollow projecting ledge formed intermediate the area of the sheet to serve as an arm rest, the sheet being provided with a continuous integrally felted projecting bead circumscribing said ledge and serving to reinforce the sheet.

JEROME J. BLUM.